United States Patent [19]

Stretton et al.

[11] Patent Number: 5,570,415

[45] Date of Patent: Oct. 29, 1996

[54] VIDEO PROGRAMMING AND STORAGE CONTROL USING THE TELEPHONE NETWORK

[75] Inventors: Alton O. Stretton; Paul King, both of Regina, Canada

[73] Assignee: Sasktel, Regina, Canada

[21] Appl. No.: 370,835

[22] Filed: Jan. 9, 1995

Related U.S. Application Data

[63] Continuation of Ser. No. 241,458, May 11, 1994, abandoned, which is a continuation of Ser. No. 752,037, Aug. 29, 1991, abandoned.

[51] Int. Cl.[6] ............................................. H04M 11/00
[52] U.S. Cl. ..................... 379/110; 379/102; 379/104; 379/105; 379/97; 348/13; 455/6.3
[58] Field of Search ................................. 379/110, 102, 379/104, 105, 90, 97, 58, 56; 348/13, 12, 6, 7, 10; 455/3.1, 4.1, 4.2, 5.1, 6.1, 6.3

[56] References Cited

U.S. PATENT DOCUMENTS

| | | | |
|---|---|---|---|
| 4,338,492 | 7/1982 | Snopko | 379/110 |
| 4,381,522 | 4/1983 | Lambert . | |
| 4,414,432 | 11/1983 | Skerlos et al. | 379/110 |
| 4,465,902 | 8/1984 | Zato | 379/110 |
| 4,567,512 | 1/1986 | Abraham . | |
| 4,785,472 | 11/1988 | Shapiro | 379/105 |
| 4,882,747 | 11/1989 | Williams . | |
| 4,885,766 | 12/1989 | Yasuoka et al. . | |
| 4,918,439 | 4/1990 | Wozniak et al. . | |
| 5,046,093 | 9/1991 | Wachob | 358/86 |
| 5,138,649 | 8/1992 | Krisbergh et al. | 358/85 |

*Primary Examiner*—Curtis Kuntz
*Assistant Examiner*—Stella L. Woo
*Attorney, Agent, or Firm*—Davis, Bujold & Streck, P.A.

[57] ABSTRACT

This invention relates to a multi-function, hand-held, wireless, remote control apparatus for television viewer use. An apparatus that permits the viewer to use the public telephone network, to control the selection and distribution of television entertainment and educational programming, and to directly control recorded programming playback apparatus located at a remote central television control centre. The invention also relates to control apparatus that permits the television distribution centre to remotely control the viewer's television receiving and recording apparatus. Also the invention relates to apparatus for the interfacing of a standard remote control device to different models of television receiving and recording apparatus. In addition, the invention relates to a full featured, wirelessly controlled speakerphone apparatus.

17 Claims, 12 Drawing Sheets

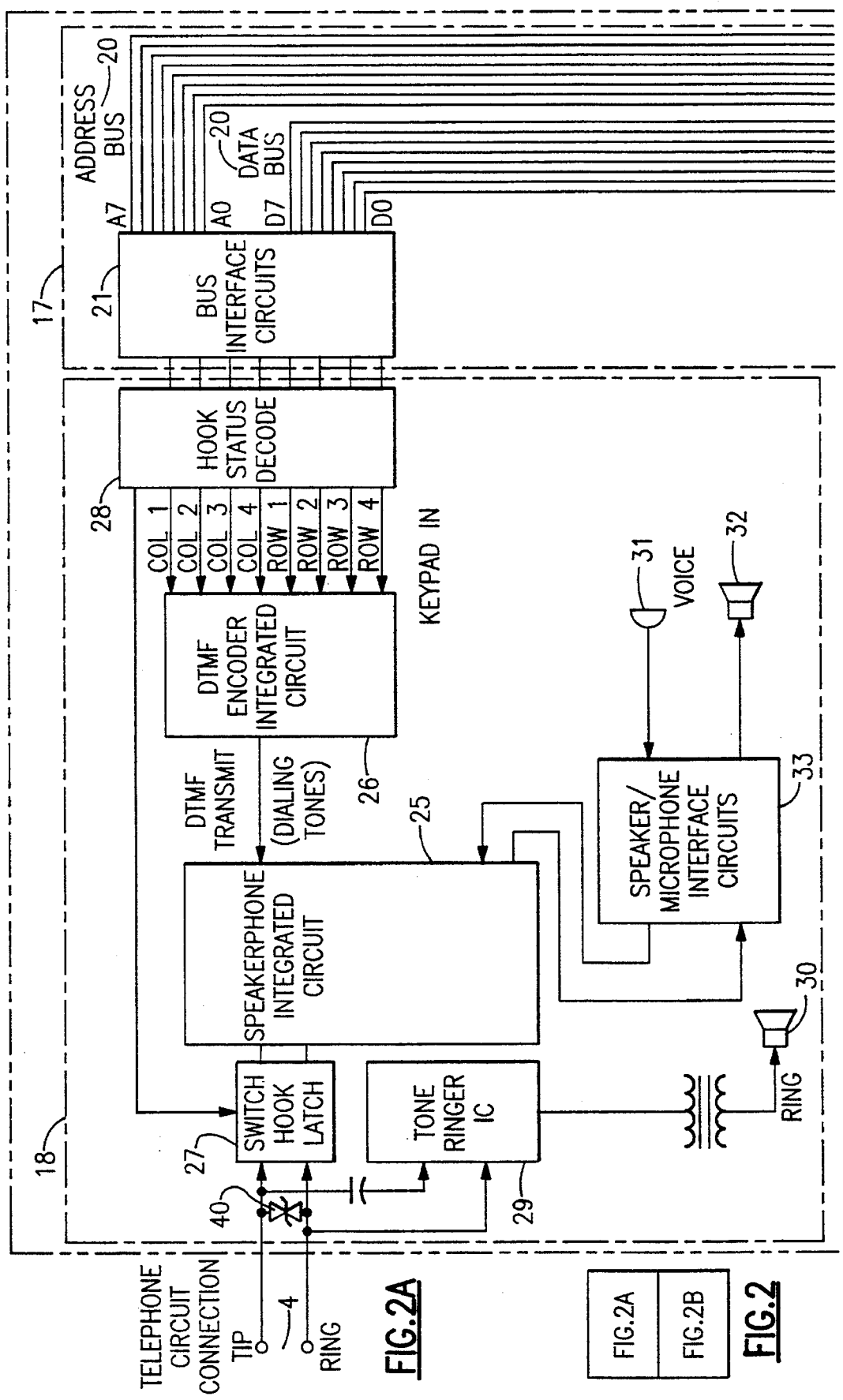

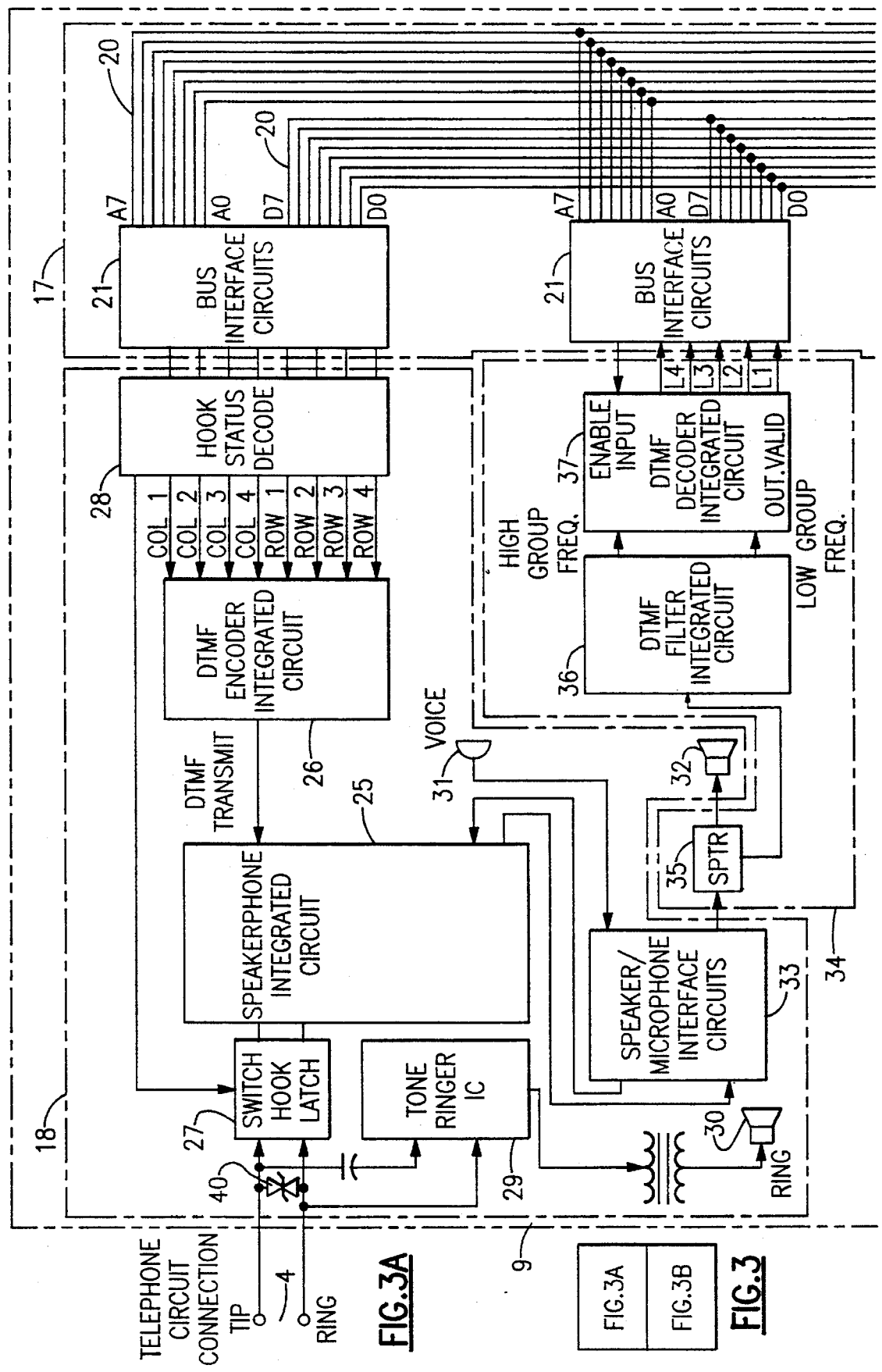

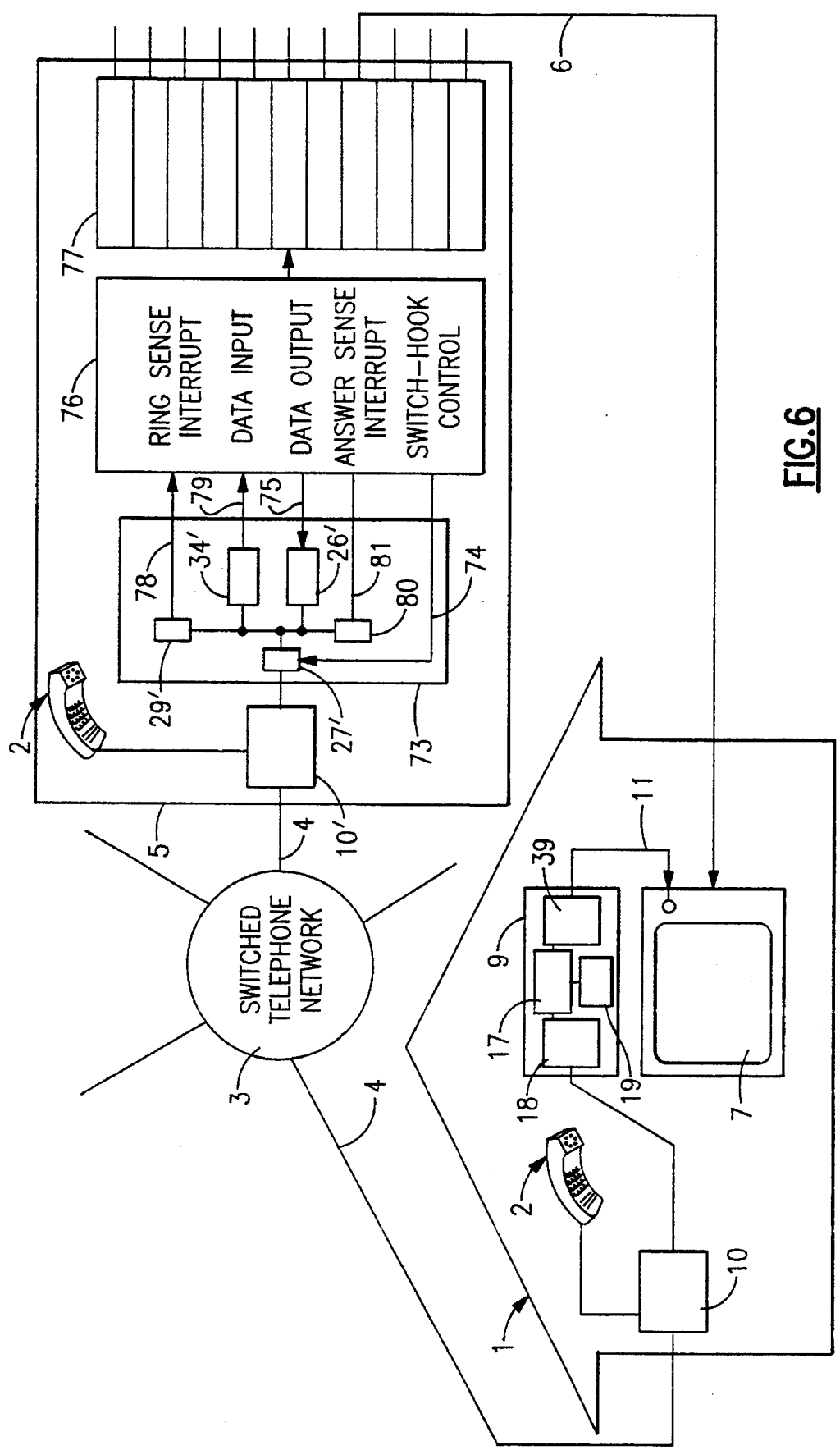

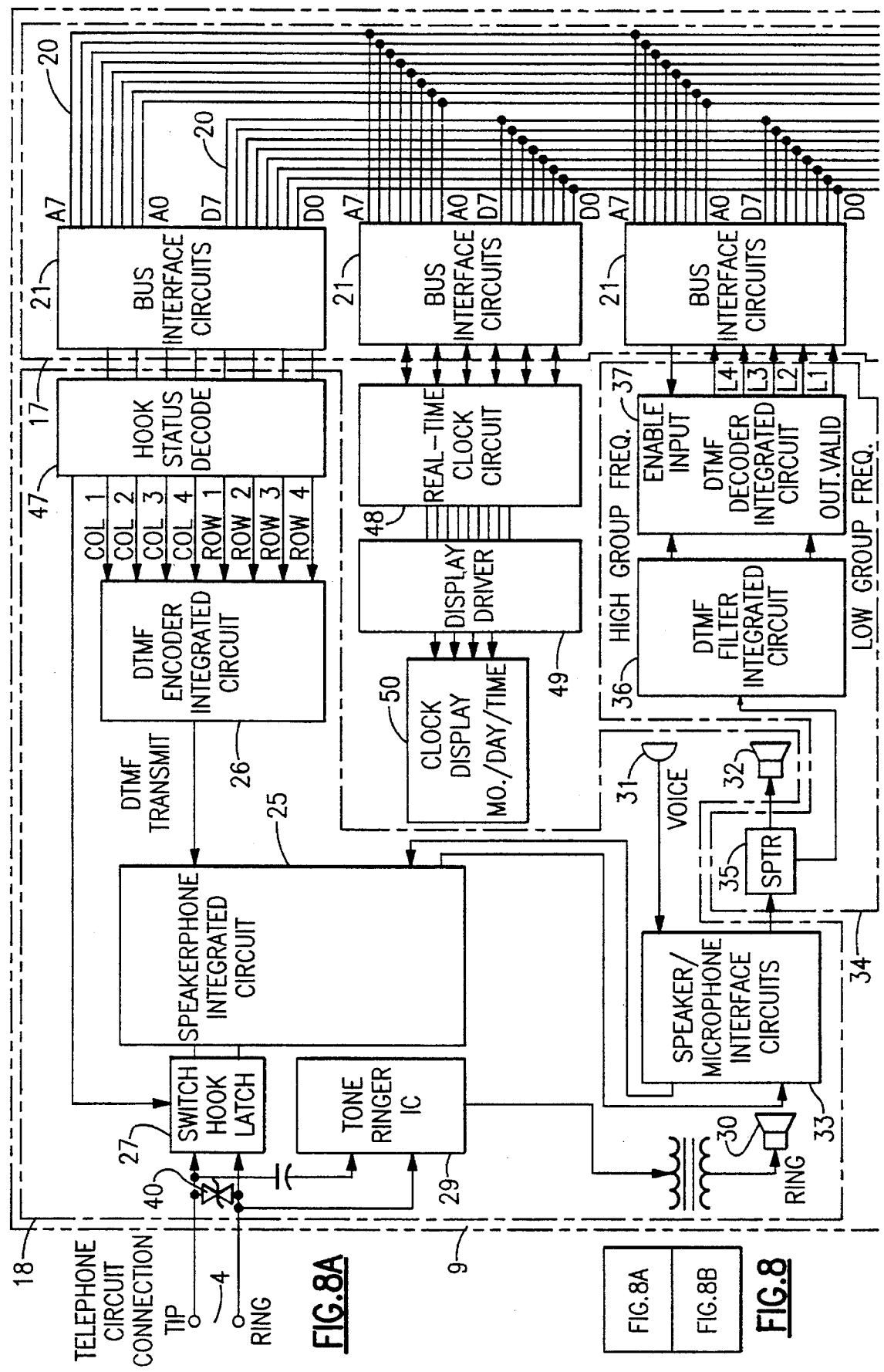

VIDEO PROGRAMMING AND STORAGE CONTROL USING THE TELEPHONE NETWORK

This is a continuation of application Ser. No. 08/241,458 filed on May 11, 1994, now abandoned, which is a continuation of application Ser. No. 07/752,037 filed on Aug. 29, 1991, now abandoned.

BACKGROUND OF THE INVENTION

This invention relates to a multi-function remote control system for; television programming ordering, television receiver control, television recorder control, telephone network access control, control of off-premises recorded playback equipment, and improved speakerphone control.

There is a need for permitting television users the ability to order programming from their viewing chair using a wireless remote control.

There is a need for permitting television users the ability to control the recorded programming playback apparatus located at a central television control centre from their viewing chair using said wireless remote control device.

There is a need for said remote control to interface with both the telephone system and a plurality of television receiving and recording apparatus.

There is a need for said remote control to be inexpensive to purchase and replace.

It is the objects of prior art that relates to the wired or wireless connection of telephone apparatus and television delivery systems to permit; security from unauthorized reception of television signals, television usage data to be remotely accessed for billing purposes, television programming to be selected, and appliances such as television receiving apparatus to be remotely controlled. There is no prior art that integrates the use of a wireless, hand-held, control unit for the object of controlling both the telephone network and a fully functional user controlled television delivery system.

There is a need for television users to talk on the telephone from their viewing chair using a speakerphone type apparatus. There is a need for television users to control the telephone using the same remote control device as used by said user to control the user's television appliances. Previous speakerphone telephone terminal art did not foresee the need for the user of a speakerphone apparatus to remotely use a wireless transmitter to generate dialling signals, volume control signals, etc. There is a need to improve speakerphone features so that they are suitable for this purpose.

Well known art includes speakerphone systems, and wireless tone generators for the transmission of audible telephone multi-frequency dialling signals. The requirement to integrated the two and to add additional remotely controlled speakerphone functions has not been previously foreseen.

Examples of prior art that uses the public telephone system to permit; the user to order programming, the television system operator to secure the delivery system, the television operator to access usage information are respectively: Bradley, Stretten, Stretten, and Wentzel (U.S. Pat. No. 4,878,245), Abraham (U.S. Pat. No. 4,590,516), and Kauffman (U.S. Pat. No. 4,710,955).

Although prior art such as embodied by Wozniak et al. (U.S. Pat. No. 4,918,439) and Yasuola, et al. (U.S. Pat. No. 4,885,766) permit a user to remotely control a television receiver and video recorder over the public telephone system using a wireless link between the telephone receiving and control unit and the appliance, both failed to foresee a need for the microprocessor control program contained in the telephone receiver control unit to be modified remotely by data received over the public telephone network for the purpose of providing the user with a simple method of adapting the control unit to interface with a new television receiving apparatus. Also neither Wozniak nor Yasuola foresaw the need for the wireless remote control of the telephone terminal apparatus.

Presently it is common in the art to incorporate within the hand-held, remote control apparatus the ability to permit the apparatus to interface with a plurality of different television apparatus. Such apparatus are known as 'universal' type remote control apparatus. Said ability is provided by incorporating within said hand-held apparatus, a learning capability, or a large memory for the storage of a plurality of codes. Both of these methods use circuitry within said hand-held apparatus with either a relatively large memory or processing capability. Said universal remote controls are costly and potentially subject to technological obsolescence as they assume that future remote control apparatus will use currently known coding methods.

As hand-held units are subject to abuse and often require replacement there is a requirement for a lower cost universal type remote control apparatus.

Present applications of user controlled television programming order and delivery systems, often referred to as Television-on-Demand or Video-on-Demand, is high contention for the electronic delivery path bandwidth. Typically there is high demand for delivery circuit bandwidth during the evening peak viewing hours, the contention for a delivery path during early morning hours is considerably lower. A problem associated with the transmission of programming for recording during these low contention periods for viewing at a later date is that of ensuring that the user has advance warning of the exact delivery time and that the users recording apparatus is programmed to record at the scheduled time. Should the central control and video library distribution point have the ability to control the user's recording apparatus the down-loading process would be simplified to the point that all the user need be concerned about is the date of transmission and that the recording device has a suitable tape, or other recording medium, loaded in the recorder. There is a need for a central television delivery point to control recording apparatus remotely located at an end users residence.

A second need for central point control is in educational applications. Should the user be a student who is studying a television delivered lecture, the student may be asked to respond to a question using the hand-held wireless remote control; and depending upon the response received, the central control computer may wish to direct the student to re-review the programming previously delivered, or direct the student to skip ahead in the delivered lesson. The direction process would be automatic if the lesson was being delivered on a plurality of television channels with each channel carrying the programming offset in time, and if the central control point could transmit data over the telephone network connection that when received at the students premises would cause the television receiver tuner to automatically switch to the so directed television channel and lesson content.

There is a need for an apparatus located in the remote end users premises that could receive data from a central control computer and direct the associated television receiving apparatus to tune to the desired television channel.

SUMMARY OF THE INVENTION

The objects of the invention are as follows:

It is an object of this invention to permit a television delivery system user, to dial a telephone, to order programming, and to start/stop/replay the programming on a real time basis, using the same wireless remote control apparatus that the user operates to tune the television signal, control the television volume, etc. The aim of the apparatus embodied herein is to permit the consumer, educator and student ordering and receiving said programming this convenience.

It is a further object of this invention to permit the user of a speakerphone apparatus the convenience of using a wireless remote control device, to answer or place a telephone call, to control speaker volume, to control ring volume, and to mute the microphone of the speakerphone terminal apparatus.

It is a further object of this invention to, simplify the circuitry and lower the replacement cost of the hand-held transmitter component of a universal type remote control while expanding its capabilities.

It is an object of this invention to provide a means for a central television delivery point to control recording apparatus remotely located at an end users residence.

It is a further object of this invention to provide a means for a television receiver remotely located in an end users residence to tune to a television channel upon command of data transmitted from a central control and television delivery point.

BRIEF DESCRIPTION OF THE DRAWINGS

FIG. 2, hereinafter refers to both FIGS. 2A and 2B, shows a functional block diagram for a wireless remote control apparatus. Said apparatus is comprised of a universal type hand control, and a set-top control unit complete with a microprocessor control sub-assembly, a wireless receiver sub-assembly, a speakerphone terminal with a telephone circuit connection and a bus circuit sub-assembly. Also shown is the user's television receiver and recorder appliances.

FIG. 3, hereinafter refers to both FIGS. 3A and 3B, shows a functional block diagram for an alternative wireless remote control apparatus. Said alternative apparatus is comprised of a simple, non-universal type hand control and a set-top control unit similar to that shown in FIG. 1; but with additional circuitry added to the set-top units microprocessor and speakerphone sub-assemblies, and a wireless transmitter subassembly added.

FIG. 6 shows a system for the remote control of the tuning of a television receiver or recorder appliance.

FIG. 8, hereinafter refers to both FIGS. 8A and 8B, shows the set-top apparatus, with a real time clock and display circuit added.

DESCRIPTION OF THE PREFERRED EMBODIMENT

Figure 1:
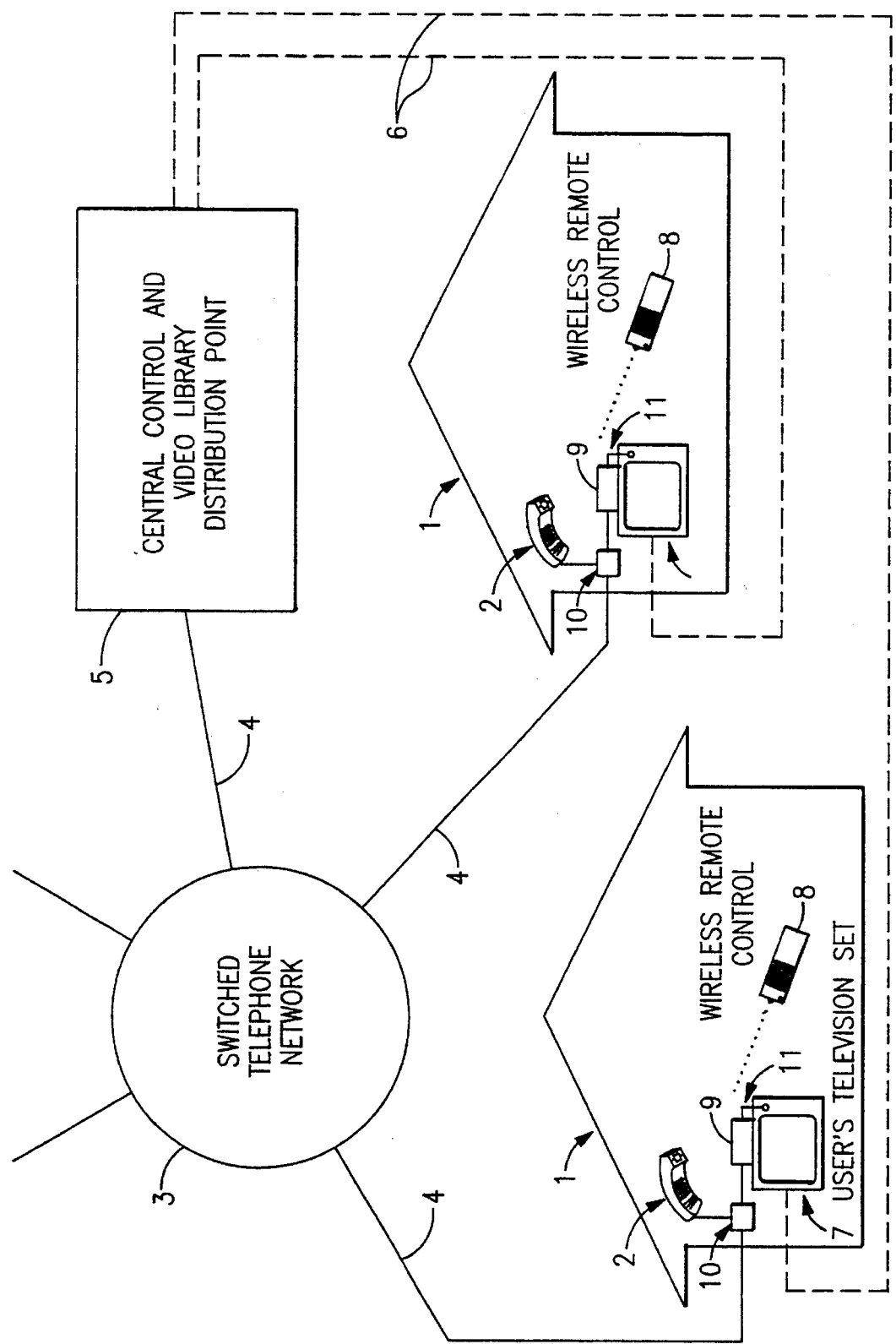
FIG. 1 is an overview of a television delivery network that uses the public telephone system, as a transmission means for the end user to control the ordering of programming, to control the video playback units located at the central control and video library distribution point, and as a transmission means for the down-loading of computer data to control equipment located at the end users location.

FIG. 1 is an overview of a television delivery network 5 and 6 that uses the public telephone system 3 and 4 for, end user control of the ordering of programming, end user control of recorded program video playback units located at the central control and video library distribution point 5, and the public telephone system for down-loading computer data to equipment located at the end users location 1.

User control signals are input by user's operation of a hand held, battery powered, remote control, wireless, transmitter apparatus 8. The wirelessly transmitted signals are received by a set-top apparatus 9, typically located on top of or near said user's television receiving appliance 7. Said set-top unit is connected by wires to the user's telephone subscriber loop cable 4 at the junction box 10. Said junction box connects the user's standard telephone terminal apparatus 2 and the set-top unit 9 in parallel. User's telephone apparatus 2 is not required for the establishment of a call, the ordering of programming, or the control of recorded program playback equipment located at the central control and distribution point 5.

Said set-top unit has built within it a speakerphone telephone terminal apparatus. When so commanded by said user, said speakerphone will establish a telephone connection by going off-hook, and transmitting multi-frequency dialling tone signals. Said hand control 8 is also capable of instructing said set-top unit to terminate the connection. Said user is able to use the speaker component of the speakerphone in said set-top unit to monitor the progress of a call, and together with the microphone component of said speakerphone carry on a telephone conversation over said telephone connection. Said user can also use the hand control 8 to transmit data required by apparatus located at the opposite end of the established connection. Said data may be input as a response to a voice request received by the user on said speaker. Typical transmitted data includes, the numerals 0 to 9, play, rewind, stop, fast forward, and pause. Said numerals being transmitted for the purpose of selecting programming, and inputting authorization and billing information. As the numerals on a telephone dial also can represent the letters of the alphabet said numerals can also be used to transmit alphabetical data, said practice is well known in the art.

On occasion, herein after any signal transmitted by user operation of the hand control may be referred to as commands, command data or command functions.

Said central control and television distribution centre 5 transmits ordered programming over a cable link 6 to said user's location 1.

One version of the embodied apparatus uses a commercially available 'universal' type wireless transmitter 8, said 'universal transmitter' is capable of transmitting signals understood by, both said user's television receiver and recorder appliances, and the set-top unit 9. Said wireless transmitter device 8 is a commercially available universal remote control transmitter and is capable of being programmed so that is can generate signals for the control of, the user's television receiver appliance 7, and said set-top apparatus 9 complete with integral speakerphone. A universal remote control is a remote control transmitter capable of being adapted or programmed such that the signals it transmits can be understood by any one television receiver and any one television recorder of the majority of the plurality of models of television receivers and recorders distributed for public consumption.

A second version of the embodied apparatus uses a simple, wireless transmitter of a type well known in the art 8, said transmitter is capable of transmitting only a fixed number of command codes; it is not able to be user adaptable so as to be understood by different models of television receiving appliances; and as it uses a minimum of complex electronic devices it is of a lower cost to manufacture than the previously said 'universal'.type transmitter. Said simple transmitter is capable of being understood by the wireless receiver circuitry within the set-top unit 9 only. For said simple transmitter version to control said television appliances 7, said simple transmitter first transmits wireless encoded commands to the set-top unit 9, said set-top unit 9 receives said commands and using a microprocessor apparatus built-in said set-top apparatus 9 interprets said commands to determine destination of said command and function of said command; said microprocessor subsequently transmits appropriate data to a 'universal' wireless control transmitter emulator built within said set-top unit 9. Said 'universal' emulator encodes control command data into a form understood by said destination apparatus 7. Said built-in wireless transmitter communicates command function so encoded to said television receiver 7 via electrical/optical link 11.

Said user may update data stored within said set-top unit 9 for the purpose of permitting said set-top unit to communicate with an alternate television receiving apparatus 7. Upon request by said user, said central control and video library distribution point 5 transmits dialling tone encoded data via switched telephone network 3 and telephone cable 4 all the data required for said set-top unit 9 to translate command data received by said set-top unit from wireless hand-held transmitter 8 into a form understood by said user's television appliances 7. Said data is stored in microprocessor memory devices within set-top apparatus 9.

Figure 2B:
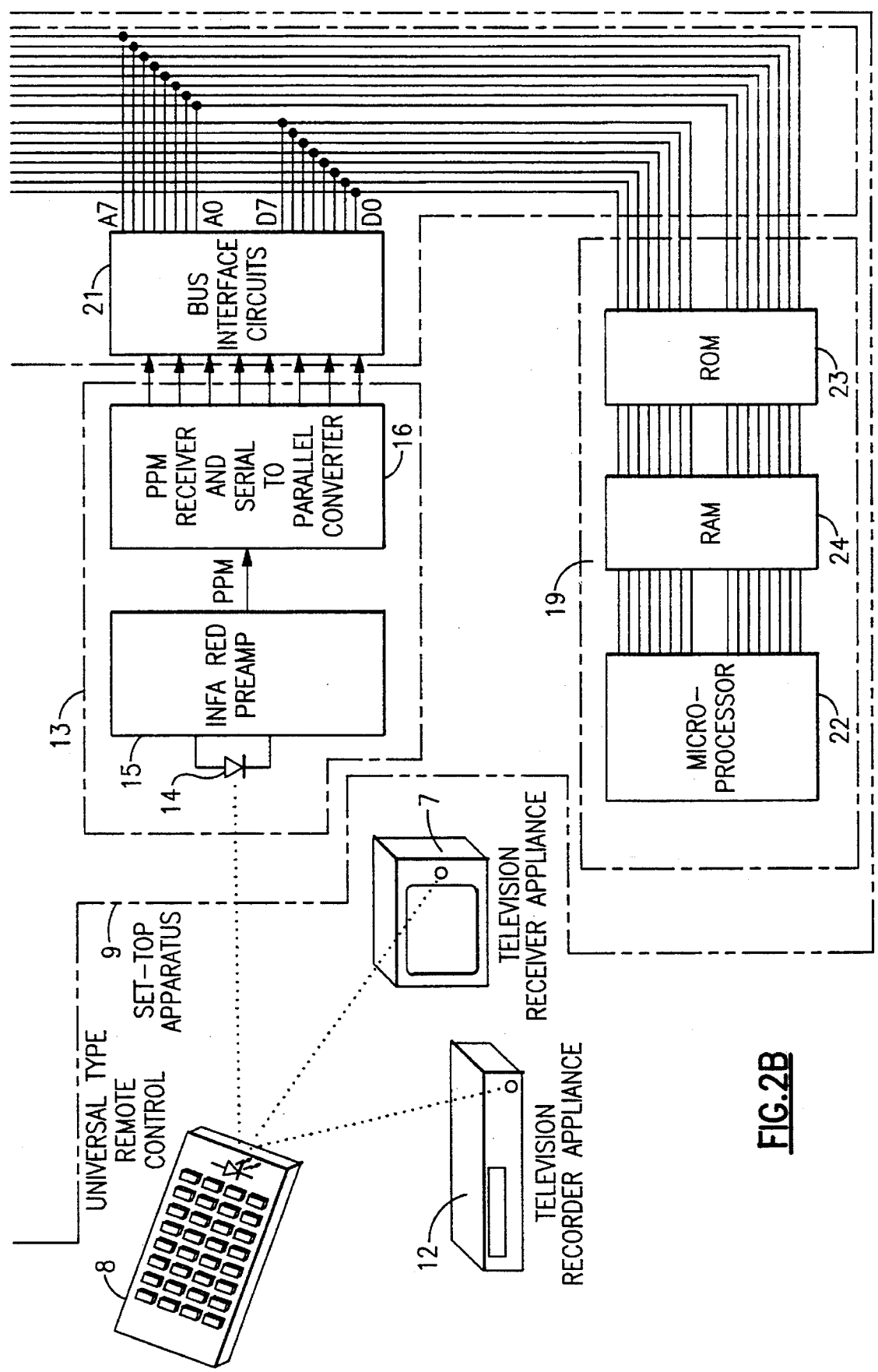

FIG. 2 is a functional block diagram for a set-top control unit 9 that normally resides on or near the end users television receiving apparatus 7. Said apparatus permits the user the convenience of transmitting data, establishing a telephone call, carrying on a telephone conversation, and terminating a telephone call, without having to hold a telephone instrument in his or her hand, but instead using the same hand control as that used to control said users television appliances. The set-top unit 9 combines a speakerphone apparatus 18 and a microprocessor based apparatus 19 for, receiving data signals generated by the wireless remote control device and translating the control signal into multi-frequency dialling tones for transmission over the telephone network.

Said wireless transmitter device 8 is a commercially available universal remote control transmitter and is capable of being programmed so that is can generate signals for the control of, the user's television receiver appliance 7, the user's television recorder appliance 12, and said set-top apparatus 9 complete with integral speakerphone 18.

Said universal remote control signal generation means 8 comprises a hand-held, battery operated, and digitally modulated wireless carrier transmitter apparatus incorporating a finger operated keypad, and a means for programming said transmitter for compatibility with said user's television receiver 7, television recorder 12 and set-top apparatus 9.

Said set-top unit 9 incorporates a wireless carrier receiver apparatus 13. Alternate wireless carrier transmitter means includes, infra-red light carrier means, UHF radio transmission means and ultrasonic audio transmission means, all said means are well known in the art. Said apparatus 13 is for an infra-red light carrier means and comprises; an infra-red detector 14 for the conversion of the received light signal into an electrical signal, an amplifier for amplifying the signal, and a demodulator, decoder, error detector and serial to parallel conversion device. Typically the receiver comprises 2 integrated circuits, herein referred after as ICs. Additionally said set-top unit 9 incorporates wiring terminals for connecting to the telephone network 4.

Additionally said set-top unit 9 incorporates a common usage bus means 17 for transmitting data, from data receivers 13, to and from data processing, and data storage circuits contained within said set-top apparatus 9, and the speakerphone type telephone terminal 18 contained within said set-top apparatus. Said bus means 17 comprises a plurality of parallel, common usage, address and data bus circuits 20, and bus interface devices 21.

Additionally said set-top unit 9 incorporates a means of controlling the flow of data over said common usage bus circuits comprising, microprocessor apparatus 19, comprising, a microprocessor 22, read-only memory devices 23 and random-access-memory devices 24, and a control program stored within said read-only memory devices, and bus interface devices.

Additionally said set-top unit 9 incorporates a means of data translation and apparatus control. Said means comprising the previously said microprocessor apparatus 19 and processing programs stored within said microprocessor memory devices. Said processing programs includes a data translation process program. Said data translation process includes; decoding of wirelessly transmitted command data, received by 13 and transmitted to the microprocessor by 17, to determine destination that each command is to be retransmitted to and function of said command; coding of command function in a form understood by said destination; and transmission of said encoded command function over bus circuits 20 to said bus interface device 21 associated with said destination.

Figure 3B:
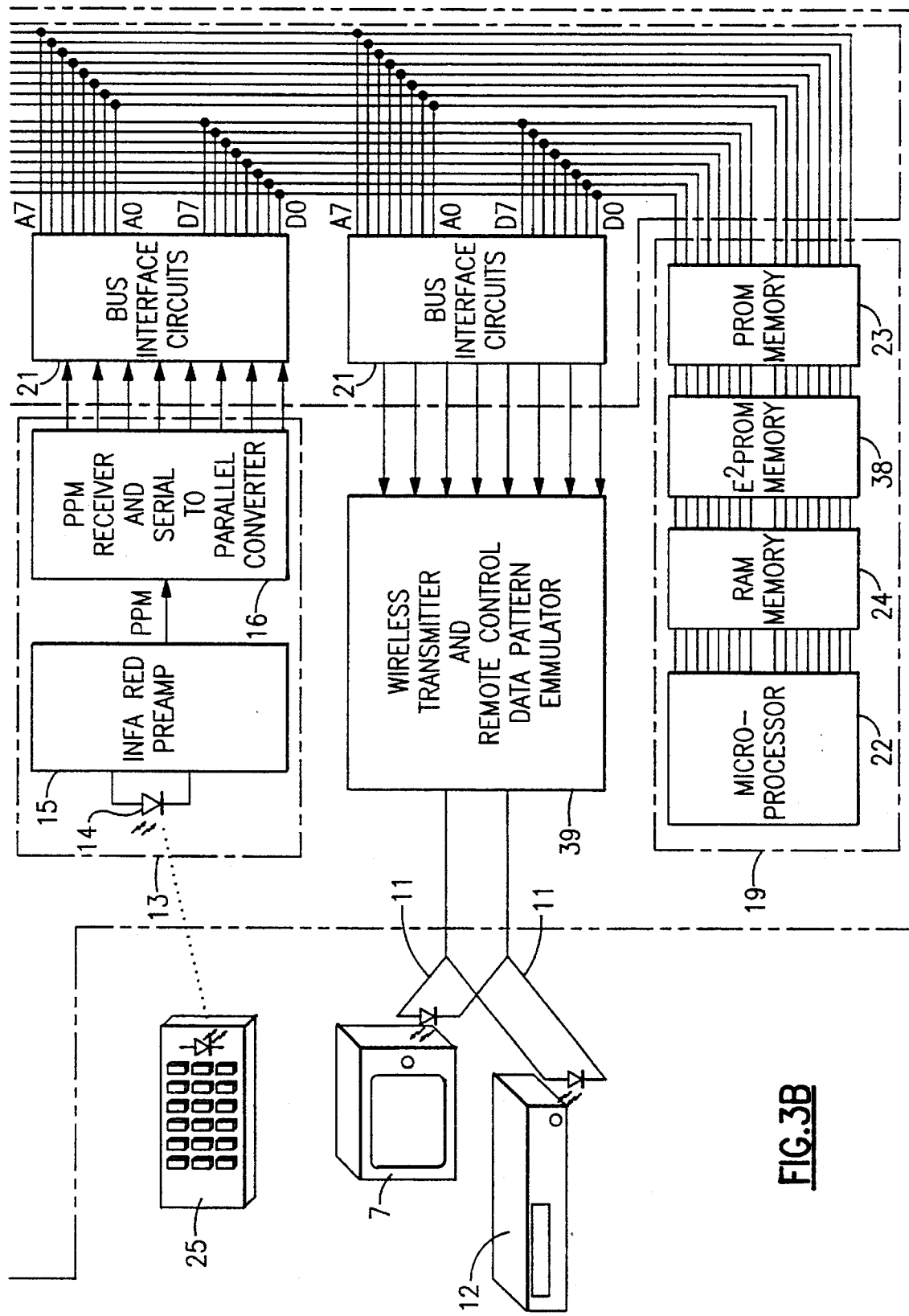

Additionally said set-top unit 9 incorporates a means 18 for transmitting voice or data commands to previously said telephone network 4, said means comprising; a speakerphone IC device 25, telephone network tone dialling transmitter IC device 26, data decoding devices 28 (devices for translating data received from said microprocessor into an X by Y matrix form required of a tone dialler IC, and detecting switch hook command requests, a switch-hook device 27 that controls telephone line seizure by switching in or out a DC current path, a call alert ringer IC device for detecting telephone system ring current and driving an acoustical ringer 30 device when said current is detected, microphone 31 speaker 32, respective impedance matching and amplification interface circuits 33, and over-voltage telephone line protection device 40. Said user establishes a telephone connection; by transmitting an off-hook command, said command is converted by the microprocessor to a code understood by the hook status decoder circuit. Then, the user waits until dial tone is heard on the speaker 32 and transmits the desired telephone number. The microprocessor converts each received number into a code that when decoded by 28 will result in the required telephone system compatible voice band multi-frequency dialling tone signal being transmitted from 26 to 25 and to 4. Once the connection is established said user may carry on a conversation wirelessly using the speakerphone microphone 31 and speaker 32, or use the numeric keypad of said hand control to transmit alphanumeric data if the established telephone connection has an apparatus connected to it suitable for the reception of dialling tone multi-frequency signals; such apparatus is well known in the art and although not specifically shown herein the principal components for such an apparatus is shown in FIG. 3 as 34 and is operationally described in the FIG. 3 description. Said user terminates the call by pressing the on-hook button on said hand control 8, the received signal is transmitted by the receiver apparatus 13 via the bus apparatus 17, to the microprocessor apparatus 19, where it is translated to a code understandable to the speakerphone apparatus 18, the microprocessor transmits the translated data via the bus network 17 to the speakerphone apparatus 18, where it is decoded by 28 and operated upon by the switch-hook latch 27; said latch opens the dc current path which is sensed by the telephone network 3 which disconnects the telephone call path.

FIG. 3 shows an alternate to the wireless television/ telephone control system embodied in FIG. 2. The primary object of the alternate control system is to simplify the hand-control apparatus, and thereby reduce the replacement cost for said apparatus.

Said alternate version of the embodied apparatus uses a simple, wireless transmitter 25 of a type well known in the art, said transmitter is capable of transmitting only a fixed number of command codes; it is not able to be user adaptable so as to be understood by different models of television receiving appliances; it typically employs an 8×4 matrix keyboard or smaller; and as it uses a minimum of complex electronic devices it is of a lower cost to manufacture than the previously said 'universal' type transmitter 8. Said simple transmitter 25 is capable of being understood by the wireless receiver circuitry 13 within the set-top unit 9 only. For said simple transmitter version to control said television appliances 7, said simple transmitter first transmits wireless encoded commands to the set-top unit 9, said set-top unit 9 receives said commands and using a microprocessor apparatus 19 built-in said set-top apparatus 9 interprets said commands to determine destination of said command and function of said command; said microprocessor subsequently transmits appropriate data to a wireless remote control emulator transmitter 39 built within said set-top unit 9. Said emulator 39 encodes control command data into a form understood by said destination apparatus 7 or 12. Said built-in wireless emulator transmitter communicates command function so encoded to said television apparatus 7 or 12 via the electrical/optical link 11.

Said user may update data stored within said set-top unit 9 for the purpose of permitting said set-top unit to communicate with a different model of television receiver appliance 7 or a different model of television recorder appliance 12. Upon request by said user, said central control and video library distribution point 5 transmits data required for permitting said set-top unit 9 to control said different model of television appliance. Said central control and video library distribution point 5 encodes said data in dialling tone multi-frequency form and transmits said encoded data via switched telephone network 3 and telephone cable 4. Said transmitted data includes all the information required for said set-top unit 9 to translate command data received by said set-top unit from wireless hand-held transmitter 25 into a form understood by said user's television appliances 7. Said data is stored in microprocessor memory devices 38 within set-top apparatus 9.

Said set-top unit 9 as shown if FIG. 3 has the following apparatus in common with, and identical to that disclosed in FIG. 2, a means of receiving wireless carrier data signals 13 from a hand-held remote control transmitter, a common use data bus means 17, wiring terminal means for connecting to the telephone network 4, and a speakerphone means 18 for transmitting voice or data commands to the telephone network and establishing or terminating a telephone connection.

Said set-top unit 9 as shown in FIG. 3 has the following apparatus in common with that shown in FIG. 2, but slightly altered from that shown in FIG. 2, a microprocessor means 19 for; controlling the flow of data within said set-top apparatus, controlling the set-top apparatus operation, translating the received data from the form received to a form understood by the destination for said data, and controlling the retransmission of said translated data. Said means as shown in FIG. 3 has an additional memory device shown 38. The contents of the data stored within 38 can be electrically erased and rewritten, and is not lost due to absence of electrical power. The device 38 is added for the storing of the translation table data as required by the microprocessor for the translation of received hand control command data into a form understood by said user's television receiving appliance, or television recording appliance. The translation table data would need to be erased and rewritten should the user change either appliance from one model to another.

There are two major additions to the set-top apparatus in FIG. 3 not included in FIG. 2. The first is the addition of a means to receive multi-frequency dialling tone encoded data 34 from a connected telephone circuit. Said means includes, a splitter circuit 35 to permit a sample of the voice band telephone signals received by the speakerphone means 25 to be connected to a multi-frequency dialling tone filter 36, detector and decoder IC 37. Valid decoded data is transferred to the non-volatile electrically erasable read only memory EEPROM device 38. Said means provides for the reception of tone encoded data transmitted upon user's request from a central computer and data file source over the connected telephone network to said user's premises, said data is transmitted to said wireless transmitter and remote control emulator apparatus 39 by microprocessor 22. Said data includes, the number of data bits in a function command, the code required for various commands, the required data transmission rate and carrier frequency, the error protection algorithm used by the television apparatus, the requirement for a start bit or an end bit, the requirement for a synchronization bit, and the required duration of a 1 bit and a 0 bit. Also transmitted to said emulator apparatus 39 by microprocessor 22 via bus apparatus 17 is previously said received commands from said wireless hand control transmitter 25.

Figure 4:
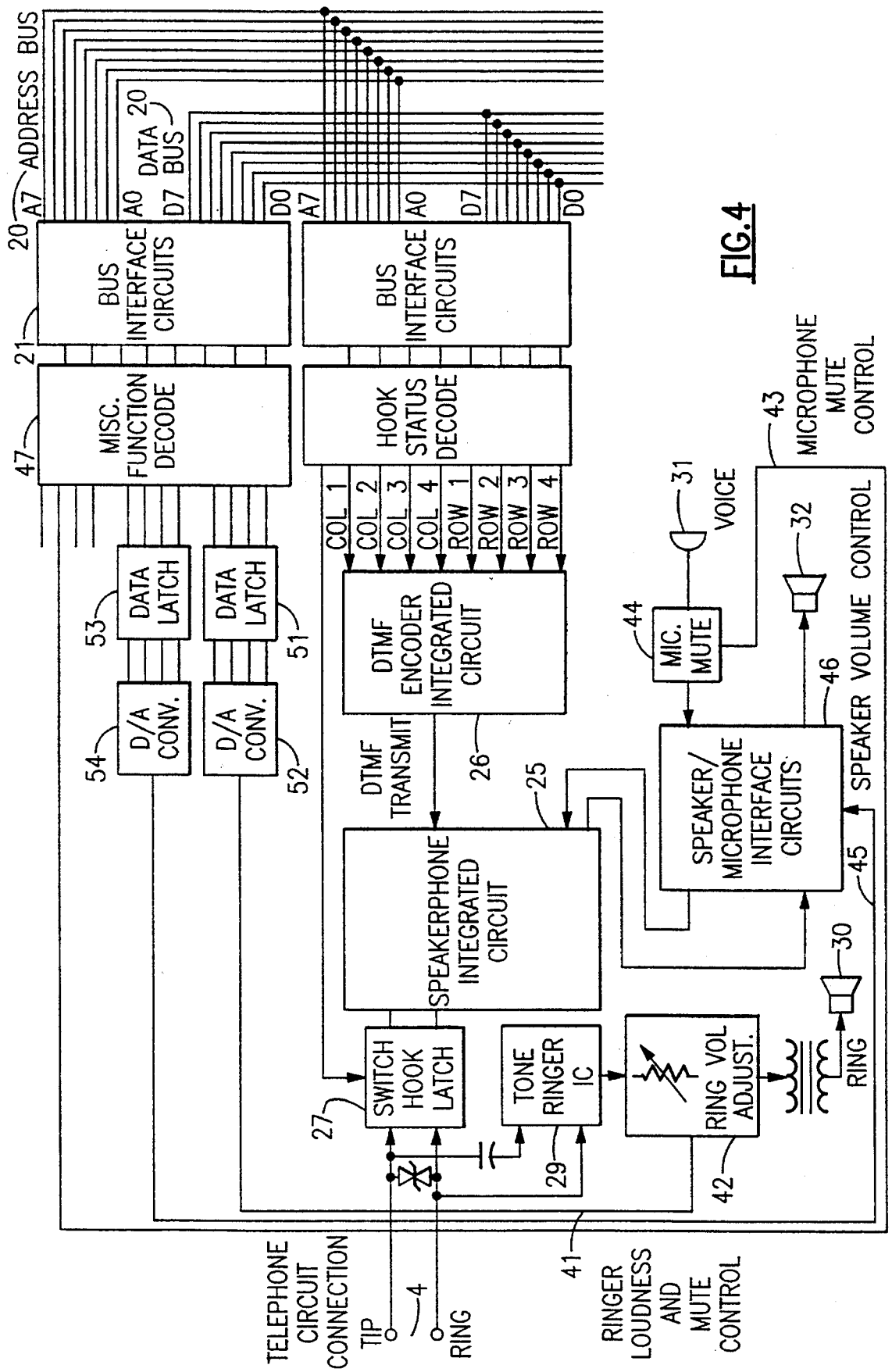
FIG. 4 shows the speakerphone apparatus component of the set-top control apparatus shown in FIG. 2 with the following features added, wireless control of the speaker volume/mute, wireless control of ring loudness/mute, wireless control of muting the microphone.

FIG. 4 shows the speakerphone apparatus component of the set-top control apparatus shown in FIG. 2 with the following features added, wireless control of the speaker volume/mute, wireless control of ring loudness/mute, wireless control of muting the microphone.

Upon receipt of a command to mute the speakerphones microphone, transmitted by the wireless transmitter 8 or 25, received by wireless receiver apparatus 13, and communicated to microprocessor apparatus 19 via bus apparatus 17, said microprocessor interprets said command and transmits a command to the miscellaneous function decode circuit 47.

Said decode circuit 47 transmits a signal via conductor 43 to the microphone mute circuit 44. Upon receipt of said signal said mute circuit 44 disconnects the microphone 31. Should electrical power to the microprocessor be interrupted, upon power up, the microprocessor initializes the microphone in the connected position.

Upon receipt of a command to decrease the audio volume of the speaker 32, transmitted by the wireless transmitter 8 or 25, received by wireless receiver apparatus 13, and communicated to microprocessor apparatus 19 via bus apparatus 17, said microprocessor interprets said command and transmits data to the miscellaneous function decode circuit 47. Said device 47 determines the destination of the received data and passes on the volume level component of said data to a data latch circuit, said decoded data replaces the old data stored in the data latch 53. Said data stored in 53 is converted to an analog form by digital to analog converter 54, said analog signal is passed on to the speaker volume control circuit 46 via conductor 45. The speaker volume interface circuit 46 adjusts the speaker volume downward with a decrease in said analog signal. The speaker is muted when its volume is at the minimum level.

Similarly when said user presses the 'speaker volume up' button on said remote control apparatus 8 or 25, the analog signal to the circuit 46 increases as does said speaker volume.

Should electrical power to the microprocessor circuit be interrupted, upon power up the microprocessor initializes said volume to a medium level.

Upon receipt of a command to decrease the ringer loudness of the acoustical finger transducer 30, transmitted by the wireless transmitter 8 or 25, received by wireless receiver apparatus 13, and communicated to microprocessor apparatus 19 via bus apparatus 17, said microprocessor interprets said command and transmits data to the miscellaneous function decode circuit 47. Said device 47 determines the destination of the received data and passes on the volume level component of said data to a data latch circuit, said decoded data replaces the old data stored in the data latch 51. Said data stored in 51 is converted to an analog form by digital to analog converter 52, said analog signal is passed on to the ringer loudness control circuit 42 via conductor 41. The ringer loudness control circuit 42 adjusts the ringer loudness downward with an appropriate change in said analog signal. The finger is muted when its loudness is adjusted to the minimum level.

Similarly when said user presses the 'ringer loudness up' button on said remote control apparatus 8 or 25 the analog signal to the circuit 42 increases the ringer loudness.

Should electrical power to the microprocessor circuit be interrupted, upon power up the microprocessor initializes said finger loudness to a medium level.

Figure 5A:
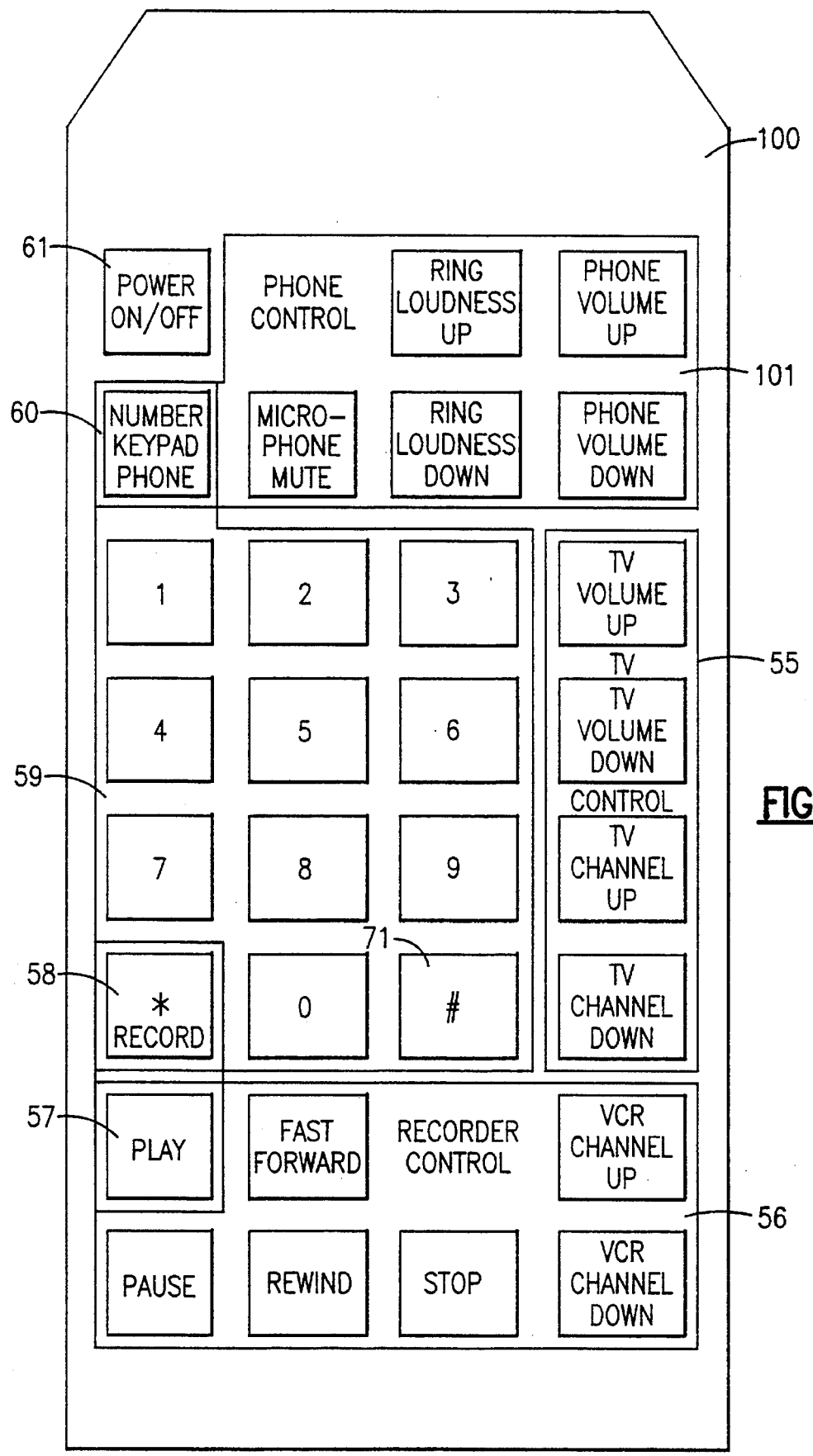
FIGS. 5A and 5B show one example of a simple, non-universal type, wireless, hand-held, remote-control device capable of generating command signals for translation by the set-top unit. Said translated command signals being capable of being understood by, the telephone system, the speakerphone apparatus, and television appliances.
Figure 5B:
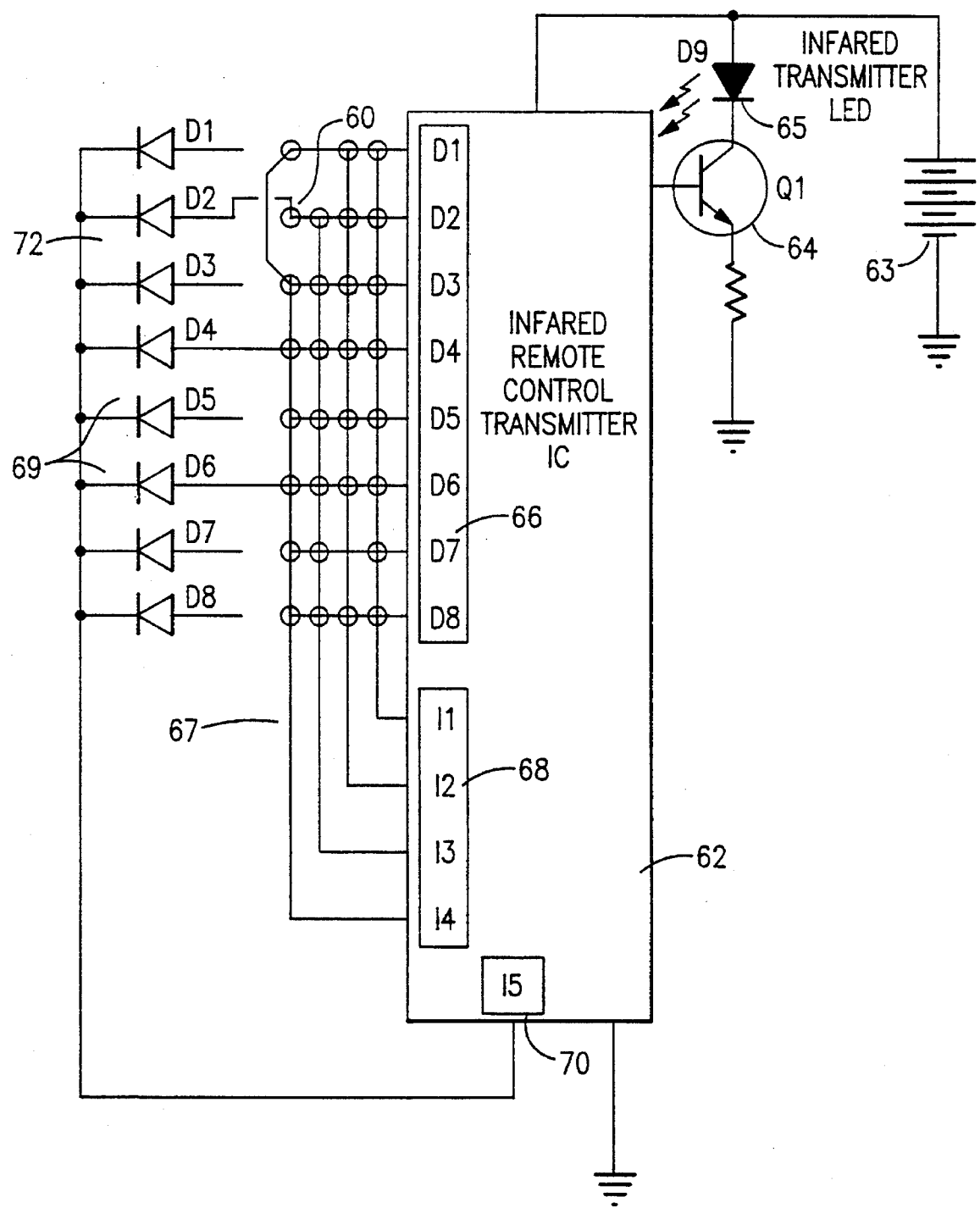

FIGS. 5A and 5B show one example of a simple non-universal type, wireless, hand-held, remote-control device 100 capable of generating command signals for translation by the set-top unit. Said device 100 is labelled as 25 in FIG. 3. Said translated command signals being capable of are understood by, the telephone system, the speakerphone apparatus, and television appliances. The hand control transmitter shown uses the Samsung KS5803B remote control transmitter integrated circuit 62.

A set of 5 buttons 101 is provided for control of the speakerphone apparatus that is built into the set-top unit 9. Said buttons provide the following functions, ringer loudness up, ringer loudness down, speakerphone speaker volume up, speakerphone speaker volume down, and microphone mute.

A set of 4 buttons 55 is provided for control of the television receiver appliance. The buttons are the TV volume up and down, and channel tuner up and channel tuner A set of 6 buttons 56 is provided for control of the television recorder appliance. Said buttons provide the following functions, recorder tuner channel up, recorder tuner channel down, pause, stop, rewind and fast forward. In addition two more buttons 57 and 58 are provided for play and record control. The record button 58 will not initiate recording unless it is pressed first and then after being held down a certain period of time the play button 57 is also pressed. The Samsung transmitter IC is designed to provide this record protection feature.

A set of 12 numeric keypad buttons 59 is provided for the purpose of transmitting commands for both dialling telephone numbers and direct television recorder appliance channel change tuner control. Said set of 12 buttons includes the star button 58 and the pound button 71.

Normally when said numeric keypad buttons are depressed the channel tuning of television recorder device is commanded, or if the pound button 71 is pressed the speaker-phone goes off-hook or if already off-hook goes on-hook, or as previously said the button 58 is the record control for the recording appliance; however, when the button 60 is depressed simultaneously with any of the 12 numeric keypad buttons 59 (including buttons 58 and 71), then telephone multi-frequency dialling tone signals are generated by the speakerphone apparatus 18. The button 60 is also shown in the circuit diagram for the hand control. Depressing the button 60, causes said Samsung device to generate different data when the numeric keypad buttons are depressed than is generated when it is not depressed simultaneously as said numeric keypad buttons 59 are depressed.

The Samsung infrared remote control transmitter IC circuit 62 shown in FIG. 5B is powered by the battery 63. The device 62 transmits serial data that is current amplified by the transistor 64. Said amplified current is the drive signal for an infra-red transmitter light emitting diode 65. Said IC device 62 outputs data to the keyboard 67 from outputs 01 to 08 shown as 66. Unless a key is depressed the IC 62 will not receive data at inputs 11 to 14, shown as 68. Should one of the keys 67 be depressed the data will only be returned to one of the said inputs when a logic 1 signal is applied to the output that corresponds to the row in which said depressed key resides. The input that receives the outputted logic 1 corresponds to the column in which said key resides. With the exception of button 60, the pressing of a button 67 results in a cross-connection being made between a row output 66 and a column input 68, a practice well known in the art.

By strapping in any combination of the diodes D1 to D8, for example D4 and D6 as shown in FIG. 5 as 69, the IC 62 can be programmed to transmit any group of 32 data pattern commands out of several hundred possible said groups of data pattern commands. This feature of the Samsung IC is provided to allow the user to choose codes that will not be acted upon by an apparatus for which the transmission is not intended. The button 60 is wired such that when it is pressed simultaneously as that of the numeric keypad buttons 59 the transmitter IC will transmit data patterns different than that transmitted without said button 60 being simultaneously pressed. Said key 60 permits switching between two alternate sets of data to be transmitted by said hand control 53 when the said numeric keypad 59 is used.

FIG. 6 shows a system for the remote control of the tuning of a television receiver 7 or recorder appliance. The recorder appliance is not shown but would simply replace the television receiver shown in the diagram. Said appliance receives television signals via a cable 6 connecting the end users premises 2 to a central television control and distribution point 5.

Said user located at premises 2 uses the hand-held remote control apparatus shown in FIG. 1 as 8 and in FIG. 3 as 25 to address said control centre 5, using said switched telephone network 4. Upon the establishment of a telephone connection from 1 to 5 said user uses said hand control to transmit identification data and program selection data to the control computer 76. Said control centre computer 76 determines the radio frequency channel said ordered programming is to be transmitted on and transmits control signals to television programming distribution equipment 77. Said programming is then transmitted on cable 6. Said computer can be programmed to transmit television apparatus tuning data via 75 to the multi-frequency dialling tone generator 26, for transmission over said telephone network 4, said data is received by set-top unit 9 and converted back into a computer data format by the speakerphone apparatus 18, and the multi-frequency decoder circuit 34, the decoded data is then transmitted via the bus apparatus 17 to the microprocessor apparatus 19 where said data is translated and retransmitted via said bus apparatus to the wireless transmitter 39 via the bus network 17 and transmitted to the television appliance 7 via the electrical/wireless link 11. As long as the telephone link remains established said central control computer remains capable of switching the television channel that said users television receiver is tuned to. Should the user be prompted by a question delivered on the television screen 7 to reply to said question, and should said user respond by transmitting a telephone dial digit using said hand-held wireless transmitter, said computer will receive said response via multi-frequency decoder circuit 34, and data cable 79, said circuit 34, is very similar to circuit 34 of the set-top unit 9; said control computer may be programmed to switch the channel received on said users television apparatus according to the received response. Other components of said telephone multi-frequency transmitter/receiver apparatus 73 are also very similar to those incorporated in the set-top apparatus 9; they include a ring signal sensor circuit 29, and associated interrupt signal path 78, the multi-frequency dialling tone transmitter 26, that receives data from said computer 76 via data cable 75, the multi-frequency dialling tone receiver 34, and said interconnect cable 79, a switch-hook control apparatus 27, and control signal path 74. An additional apparatus is an answer sense apparatus 80 and sense signal path 81, said apparatus is required for said control computer to sense when the users phone goes off-hook, should said transmitting computer be initiating the establishment of a telephone connection then said computer 76 requires this information for the purpose of knowing when said receiving apparatus 9 is ready for data transmission. Answer sense apparatuses are well known in the art.

Figure 7:
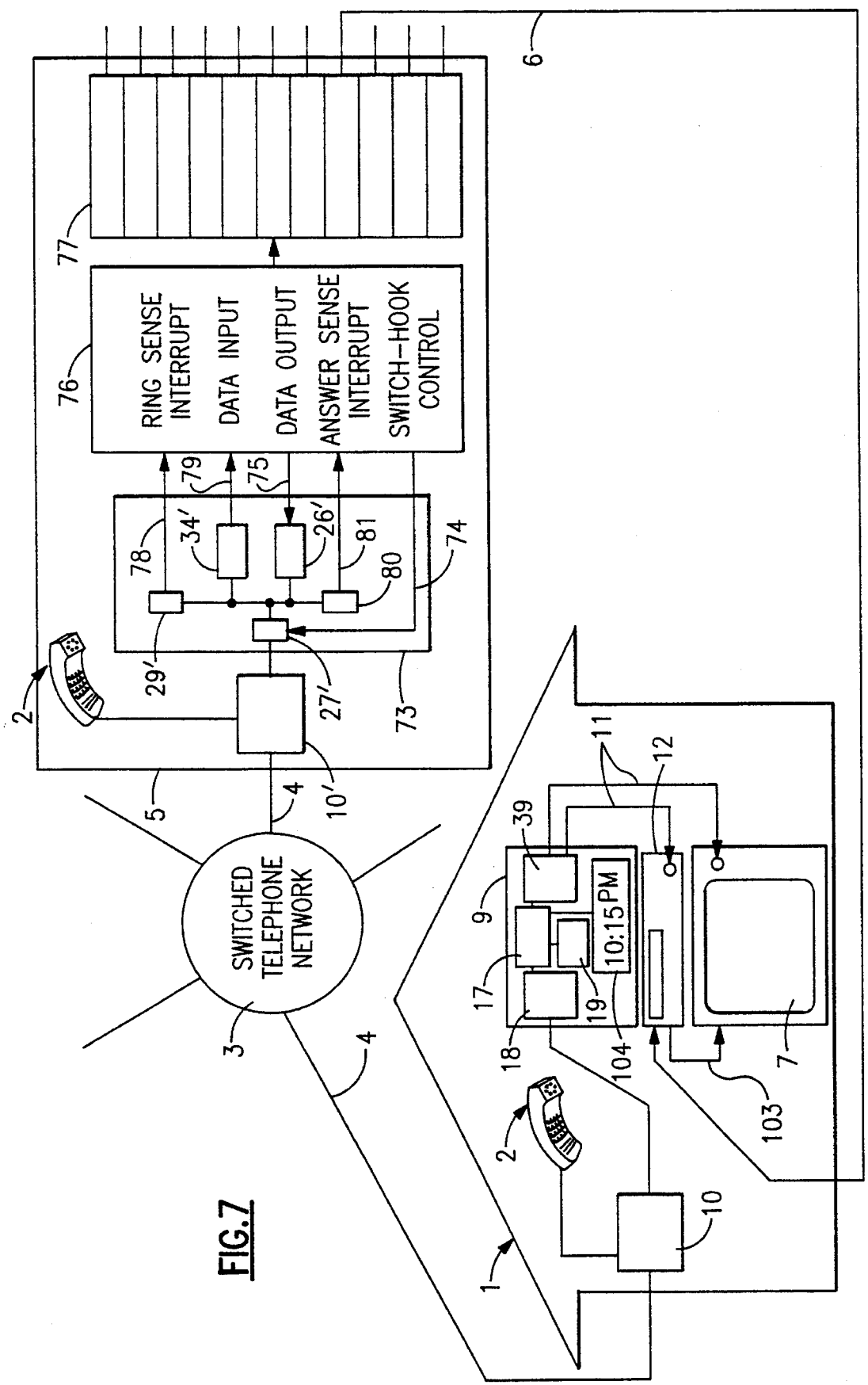
FIG. 7 shows a system for the remote control of the recording operation of a television recorder appliance.

FIG. 7 shows a system for the remote control of the recording operation of a television recorder appliance 12. Said appliance receives television signals via a cable 6 connecting the end users premises 1 to a central television control and distribution point 5. The output of said recorder 12 is connected to a television receiver appliance 7 via cable 103.

Said user located at premises 1 uses the hand-held remote control apparatus shown in FIG. 2 as 8 and in FIG. 3 as 25 to address said control centre 5, using said switched telephone network 4. Upon the establishment of a telephone connection from 1 to 5 said user uses said hand control to transmit identification data and program selection data to the control computer 76. Said control centre computer 76 determines the radio frequency channel said ordered programming is to be transmitted on and transmits control signals to television programming distribution equipment 77. Said programming is then transmitted on cable 6. Said computer can be programmed to transmit television recorder control data via 75 to the multi-frequency dialling tone generator 26, for transmission over said telephone network 4, said data is received by set-top unit 9 and converted back into a computer data format by the speakerphone apparatus 18, and the multi-frequency decoder circuit 34, the decoded data is then transmitted via the bus apparatus 17 to the microprocessor apparatus 19 where said data is translated and retransmitted via said bus apparatus to the wireless transmitter 39 via the bus network 17 and transmitted to the television appliance 7 via the electrical/wireless link 11. Said data programs said recorder to begin recording at a specified time and date. Should said recorder not have a capability of being so time programmed a real time clock 104 may be added to said set-top unit.

Figure 8B:
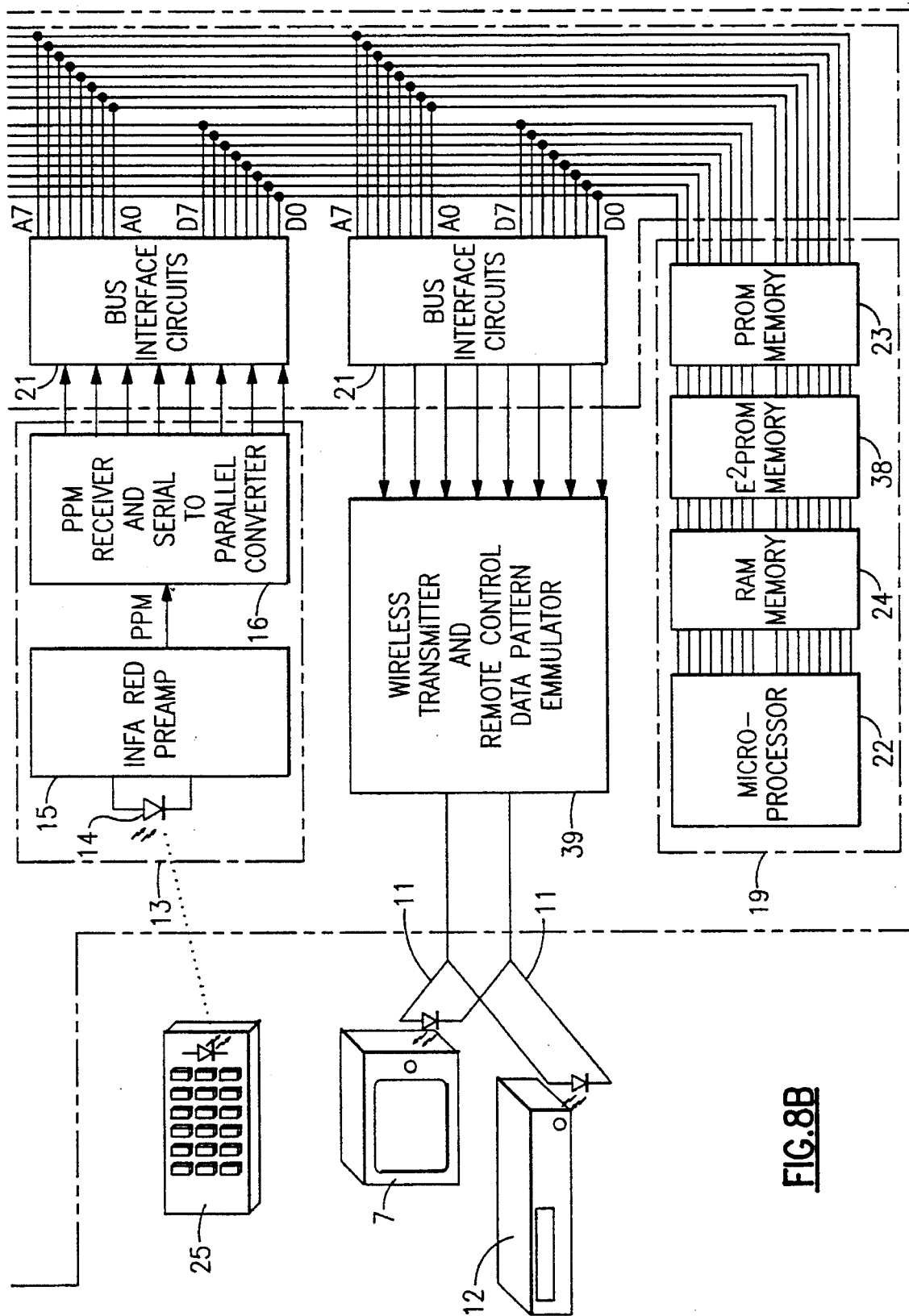

FIG. 8 shows the set-top unit 9, with a bus connected real-time clock circuit 48 and display apparatus 49 and 50 added, said apparatus is well known in the art. Said apparatus is referred to in FIG. 7 as 104.

We claim:

1. A television and telephone control apparatus comprising:

a receiver for detecting encoded user command signals and encoded data signals transmitted by a wireless remote control transmitter and for transmitting the encoded user command signals and encoded data signals;

a processor for
i) receiving the encoded user command signals and encoded data signals from the receiver;
ii) interpreting the encoded user command signals and encoded data signals to determine a specified destination of the encoded user command signals and of the encoded data signals;
iii) translating the encoded user command signals into command signals having a form understood by apparatus at the specified destination;
iv) translating the encoded data signals into data signals having a form for receiving and understanding by the specified destination apparatus;
v) transmitting the translated command signals and translated data signals to the specified destination; and, a telephone terminal apparatus for connection to a telephone network, the telephone terminal apparatus being connected to the processor for receiving command signals and data signals from the processor, and responsive to unique predetermined command signals for establishing, maintaining and terminating a telephone connection over the telephone network, the telephone terminal apparatus also for transmitting data signals received from the processor over the telephone network, wherein the telephone terminal apparatus includes a multi-frequency dialling tone converter for converting data signals received from the processor into multi-frequency dialling tone signals for transmission over the telephone network.

2. An apparatus according to claim 1 wherein the telephone terminal apparatus, upon receiving unique predetermined command signals from said processor, establishes a telephone connection with a central television control center and transmits one of command and data signals to said central television control center, said one of command and data signals corresponding to one of commands and data input by a user actuating at least one key on said wireless remote control transmitter.

3. An apparatus according to claim 2 wherein said one of command and data signals comprises user commands for ordering television programming from the central television control center whereby the television programming is transmitted to a television appliance over a cable television communications link in response to the user commands.

4. An apparatus according to claim 2 wherein said one of command and data signals comprises user commands for controlling playback of video equipment at the central television control center.

5. An apparatus according to claim 4 wherein the user commands for controlling the playback of video equipment at the central television control center include commands for the video equipment to play, stop, rewind and fast forward.

6. A television and telephone control apparatus comprising:
   a receiver for detecting encoded user command signals and encoded data signals transmitted by a wireless remote control transmitter and for transmitting the encoded user command signals and encoded data signals;
   a processor for
      i) receiving the encoded user command signals and encoded data signals from the receiver;
      ii) interpreting the encoded user command signals and encoded data signals to determine a specified destination of the encoded user command signals and of the encoded data signals;
      iii) translating the encoded user command signals into command signals having a form understood by apparatus at the specified destination;
      iv) translating the encoded data signals into data signals having a form for receiving and understanding by the specified destination apparatus;
      v) transmitting the translated command signals and translated data signals to the specified destination; and,
   a telephone terminal apparatus for connection to a telephone network, the telephone terminal apparatus being connected to the processor for receiving command signals and data signals from the processors, and responsive to unique predetermined command signals for establishing, maintaining and terminating a telephone connection over the telephone network, the telephone terminal apparatus also for transmitting data signals received from the processor over the telephone network, wherein the telephone terminal apparatus comprises a speakerphone telephone comprising:
      i) a speaker for providing audio output of signals received over the telephone network;
      ii) a microphone for converting audio sounds to telephone signals for transmission over the telephone network; and,
      iii) a call alert ringer device for detecting telephone system ring current and an acoustical ringer device responsive to the call alert ringer device for issuing an audio ring signal when a ring current is detected.

7. An apparatus according to claim 6 wherein the encoded command signals are generated by a wireless remote control unit and include encoded telephone command signals for controlling speakerphone telephone functions including muting of microphone, controlling speaker volume and controlling ringer loudness.

8. A television and telephone control apparatus comprising:
   a receiver for detecting encoded user command signals and encoded data signals transmitted by a wireless remote control transmitter and for transmitting the encoded user command signals and encoded data signals;
   a processor for
      i) receiving the encoded user command signals and encoded data signals from the receiver;
      ii) interpreting the encoded user command signals and encoded data signals to determine a specified destination of the encoded user command signals and of the encoded data signals;
      iii) translating the encoded user command signals into command signals having a form understood by apparatus at the specified destination;
      iv) translating the encoded data signals into data signals having a form for receiving and understanding by the specified destination apparatus;
      v) transmitting the translated command signals and translated data signals to the specified destination; and,
   a telephone terminal apparatus for connection to a telephone network, the telephone terminal apparatus being connected to the processor for receiving command signals and data signals from the processors, and responsive to unique predetermined command signals for establishing, maintaining and terminating a telephone connection over the telephone network, the telephone terminal apparatus also for transmitting data signals received from the processor over the telephone network;
   memory means connected to the processor for storing data wherein the data stored in the memory includes data translation processing programs which are accessed by the processor for interpreting and translating encoded user command signals and encoded data signals transmitted by the wireless remote control transmitter into command signals and data signals and for determining the specified destination of the encoded user control signals and encoded data signals.

9. An apparatus according to claim 8 further comprising a universal wireless remote control transmitter emulator, wherein the command signals, the specified destination of which is determined by the processor to be a television appliance, are translated by the processor into a form understood by the emulator and transmitted by the processor to the emulator; and wherein the emulator is adapted for
   i) receiving the command signals transmitted by the processor;
   ii) encoding the command signals into television appliance command signals having a form understood by the destination television appliance;
   iii) transmitting encoded television appliance command signals to the destination television appliance by one of an electrical and optical link, the destination television appliance being responsive to the television appliance command signals.

10. An apparatus according to claim 9 further comprising:
   i) a multi-frequency dialling tone receiver for receiving multi-frequency dialling tone encoded data over a connected telephone circuit; and,
   ii) a multi-frequency dialling tone decoder for decoding and translating the multi-frequency dialling tone encoded data into digital data and for transmitting the digital data to the processor.

11. An apparatus according to claim 10 wherein the data translation processing programs stored in the memory can be one of modified, edited and replaced remotely in response to digital data received over a connected telephone circuit.

12. An apparatus according to claim 11 wherein the data translation processing programs can be one of modified, edited and replaced remotely such that the encoded television command signals encoded by the emulator in response to command signals received from the processor can be encoded in a form understood by different brands of television appliances, to enable the apparatus to be adapted from a remote site for use with different brands of television appliances.

13. An apparatus according to claim 10 wherein the digital data comprises command signals which enable the control of television appliances from a remote site over the telephone network.

14. An apparatus according to claim 13 further comprising a real time clock wherein the apparatus can be programmed from a remote site over the telephone network to cause the emulator to transmit encoded television appliance command signals to specified destination television appliances at a specified time and date.

15. An apparatus according to claim 9 wherein said wireless remote control transmitter is a commercially available, low-cost, battery operated, hand-held remote control transmitter having means for transmitting command signals which are received and understood only by said television and telephone control apparatus.

16. A television and telephone control apparatus comprising:
a receiver for detecting encoded user command signals and encoded data signals transmitted by a wireless remote control transmitter and for transmitting the encoded user command signals and encoded data signals;
a processor for
i) receiving the encoded user command signals and encoded data signals from said receiver;
ii) interpreting the encoded user command signals and encoded data signals to determine a specified destination of the encoded user command signals and of the encoded data signals;
iii) translating said encoded user command signals into command signals having a form understood by apparatus at the specified destination;
iv) translating said encoded data signals into data signals, said data signals having a form for receiving and understanding by the specified destination apparatus;
v) transmitting said translated command signals and translated data signals to the specified destination; and,
a telephone terminal apparatus for connection to a telephone network, the telephone terminal apparatus being connected to the processor for receiving command signals and data signals, and responsive to unique predetermined command signals for establishing, maintaining and terminating a telephone connection over the telephone network; wherein,
i) the telephone terminal apparatus comprises a multi-frequency dialling tone converter for converting data signals received from the processor into multi-frequency dialling tone signals for transmission over the telephone network;
ii) the telephone terminal apparatus, upon receiving unique predetermined command signals from the processor, establishes a telephone connection with a central television control center and transmits data signals to the central television control center, the data signals corresponding to data input by a user actuating at least one key on a wireless remote control transmitter, the data signals comprising user commands for
ordering television programming from the central television control center wherein the television programming is transmitted to a television appliance over a cable television communications link; and,
controlling video playback equipment at the central television control center for transmission of television programming to the user's television appliance over a cable television communications link, wherein the user commands include commands which cause the video playback equipment to play, stop, rewind, and fast forward the television programming being transmitted to the user's television apparatus.

17. A television and telephone control apparatus comprising:
a commercially available, low-cost, battery operated, hand-held remote control transmitter having means for transmitting encoded user command signals and encoded data signals;
a receiver for detecting encoded user command signals and encoded data signals transmitted by the wireless remote control transmitter and for transmitting the encoded user command signals and encoded data signals;
a processor for
i) receiving the encoded user command signals and encoded data signals from the receiver;
ii) interpreting the encoded user command signals and encoded data signals to determine a specified destination of the encoded user command signals and of the encoded data signals;
iii) translating the encoded user command signals into command signals having a form understood by apparatus at the specified destination;
iv) translating the encoded data signals into data signals having a form for receiving by the specified destination apparatus; and,
v) transmitting said translated command signals and translated data signals to the specified destination; and
a speakerphone telephone for connection to a telephone network, the speakerphone telephone being connected to the processor for receiving command signals and data signals from the processor and responsive to unique predetermined command signals for establishing, maintaining and terminating a telephone connection over the telephone network, the speakerphone telephone comprising:
i) a speaker for providing audio output of signals received over the telephone network;
ii) a microphone for converting audio sounds to telephone signals for transmission over the telephone network; and,
iii) a call alert ringer device for detecting telephone system ring current and an acoustical ringer device responsive to the call alert ringer device for issuing an audio ring signal when a ring current is detected;
a multi-frequency dialling tone converter for converting data signals received from said processor into multi-frequency dialling tone signals for transmission over the telephone network;

a universal wireless remote control transmitter emulator, wherein the command signals, the specified destination of which is determined by the processor to be a television appliance, are translated by the processor in a form understood by the emulator and transmitted by the processor to the emulator; and wherein the emulator is adapted for i) receiving command signals from the processor;
ii) encoding the command signals into television appliance command signals having a form understood by the destination television appliance; and,
iii) transmitting encoded television appliance command signals to the destination television appliance by one of an electrical and optical link, the destination television appliance being responsive to the television appliance command signals; and a multi-frequency dialling tone receiver and decoder for receiving multi-frequency dialling tone encoded data over a connected telephone circuit, for decoding and translating the multi-frequency dialling tone encoded data into digital data, and for transmitting the digital data to the processor; and wherein the digital data comprises i) digital data for remotely one of modifying, editing and replacing data translation processing programs such that the encoded television command signals encoded by the emulator in response to command signals received from the processor can be encoded in a form understood by different brands of television appliances to enable the apparatus to be adapted from a remote site for use with different types or brands of television appliances;
ii) digital data comprising command signals which enable the television appliances to be controlled from the remote site over the telephone network.

* * * * *